United States Patent [19]

Sasaki et al.

[11] Patent Number: 4,618,422
[45] Date of Patent: Oct. 21, 1986

[54] FILTER DEVICE FOR A FUEL TANK

[75] Inventors: Michiaki Sasaki, Hadano; Akira Mizusawa, Fujisawa, both of Japan

[73] Assignees: Nissan Motor Company, Limited; NIFCO Incorporated, both of Japan

[21] Appl. No.: 769,803

[22] Filed: Aug. 27, 1985

Related U.S. Application Data

[63] Continuation of Ser. No. 598,679, Apr. 10, 1984, abandoned.

[30] Foreign Application Priority Data

Apr. 25, 1983 [JP] Japan .................................. 58-72394

[51] Int. Cl.⁴ ........................ B01D 29/10; B01D 35/02
[52] U.S. Cl. .................................. 210/172; 210/416.4; 210/438; 210/460; 210/485
[58] Field of Search ............ 210/131, 172, 232, 416.4, 210/438, 439, 460, 461, 462, 463, 485

[56] References Cited

U.S. PATENT DOCUMENTS

| | | | |
|---|---|---|---|
| 1,072,371 | 9/1913 | Stone | 210/172 |
| 2,382,278 | 8/1945 | Widman | 210/232 |
| 2,810,482 | 10/1957 | Kasten | 210/460 |
| 2,821,305 | 1/1958 | Anderson | 210/232 |
| 2,923,411 | 2/1960 | Oster | 210/172 |
| 3,002,870 | 10/1961 | Belgrade | 210/232 |
| 3,108,065 | 10/1963 | McMichael | 210/172 |
| 3,483,988 | 12/1969 | Hazzard | 210/232 |
| 3,757,951 | 9/1973 | Redenbarger | 210/131 |
| 3,826,372 | 7/1974 | Bell | 210/172 |
| 3,833,124 | 9/1974 | Sugiyama | 210/460 |
| 4,118,323 | 10/1978 | Sugiyama | 210/463 |
| 4,174,282 | 11/1979 | Butterworth | 210/232 |
| 4,204,960 | 5/1980 | Sugiyama | 210/438 |
| 4,411,788 | 10/1983 | Kimura | 210/460 |

FOREIGN PATENT DOCUMENTS

| | | | |
|---|---|---|---|
| 2042006 | 3/1973 | Fed. Rep. of Germany | 210/131 |
| 2434075 | 5/1976 | Fed. Rep. of Germany | 210/131 |
| 52-44727 | 10/1977 | Japan | 210/460 |
| 56-26805 | 6/1981 | Japan | 210/460 |

Primary Examiner—Ernest G. Therkorn
Attorney, Agent, or Firm—Leydig, Voit & Mayer, Ltd.

[57] ABSTRACT

A filter device for use in a fuel tank, has a filter body having an upper wall and a lower wall, a guide portion extending through the filter body and having an intake hole at a lower portion of the guide portion near the bottom wall of the filter body, a suction pipe having a lower portion which is inserted into the guide portion, and spring means provided between the suction pipe and the filter body for biasing the filter body toward the bottom wall of the tank body.

20 Claims, 7 Drawing Figures

FILTER DEVICE FOR A FUEL TANK

This application is a continuation, of application Ser. No. 598,679, filed Apr. 12, 1984, now abandoned.

BACKGROUND OF THE INVENTION

This invention relates to a filter device for use in a fuel tank which can be used in various vehicles.

FIG. 1 shows a conventional filter device for use in a fuel tank. A suction pipe 2 penetrates through an upper wall of a tank body 1 and projects to near a bottom wall 1A of the tank body 1. A lower portion of the suction pipe 2 is connected to a filter device F. The fuel in the tank body 1 is sucked through the suction pipe 2 after impurities are removed by the filter device F.

In this filter device F, a socket portion 6 is formed at a central portion of an upper wall 4 of the filter body 3. The suction pipe 2 is bulged so as to form a protruding portion 2a. The suction pipe 2 is inserted into the socket portion 6 in such a manner that the protruding portion 2a of the suction pipe 2 is fixed in the socket portion 6 whereby the lower portion of the suction pipe 2 is fixed relative to the filter body 3.

FIGS. 2 and 3 show another conventional filter device. The filter body 7 has at a central portion of its upper wall 8 a short pipe portion 10 which protrudes downwardly within the filter body 7. A socket portion 11 is formed on a bottom wall 9 of the filter body 7. The socket portion 11 protrudes upwardly and faces the short pipe portion 10. The suction pipe 2 is inserted through the short pipe portion 10 and received in the socket portion 11. The suction pipe 2 has at its intermediate portion a bulged protruding portion 2a which is to engage a lower edge portion of the short pipe portion 10 in such a way that the suction pipe 2 is fixed to the filter body 7. This type of conventional filter device is shown and disclosed in Japanese Utility Model Publication No. 56-26805.

In these conventional filter devices, however, the suction pipe 2 is fixed to the filter body 3, 7. If the filter body 3, 7 is positioned on or near the bottom wall 1A of the tank body 1, the filter body 3, 7 may be crushed so as to lose its filter performance when the bottom wall 1A of the tank body is inwardly deformed in case of road interferences of the tank body. In the prior art filter device of FIG. 1, the suction pipe 2 is closed by the filter bottom wall 5 at its lower end. For such a reason, the filter body 3, 7 must be apart from the bottom wall 1A of the tank body as shown in FIGS. 1 and 3 so as to avoid the deformation of the filter body 3, 7, for instance, in case of the road interferences of the tank bottom wall 1A. If the lower end of the suction pipe 2 is largely apart from the bottom wall 1A of the tank body with the distance H, the fuel suction limit moves up so that the substantial volume of the fuel tank remarkably decreases.

OBJECT OF THE INVENTION

The object of this invention is to provide a filter device for use in a fuel tank in which a filter body can be placed on or near a bottom wall of a tank body so as to increase a substantial tank volume by enlarging a fuel suction limit of a suction pipe and in which the filter body can be protected even if the bottom wall of the tank body is deformed, for instance, in case of road interferences of the tank bottom wall.

DETAILED DESCRIPTION OF PREFERRED EMBODIMENTS

Figure 1:
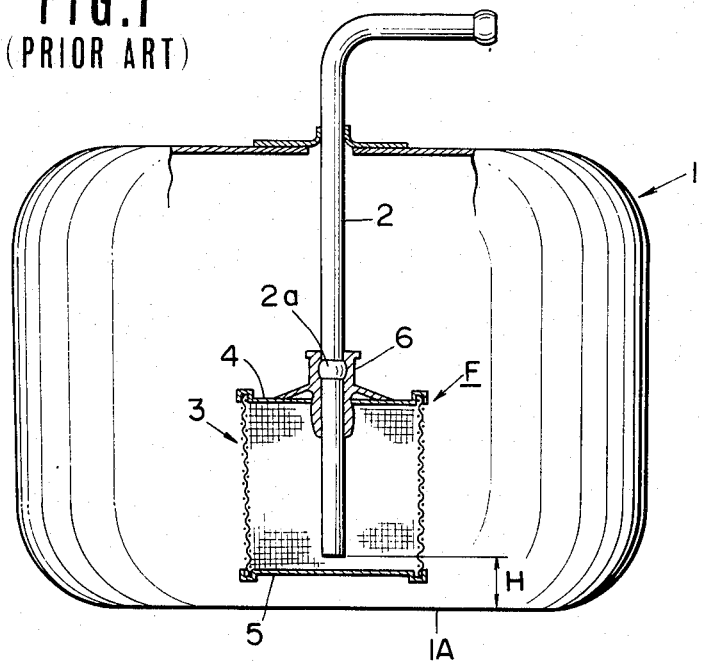
FIG. 1 is a sectional view showing a conventional filter device for use in a fuel tank.
Figure 2:
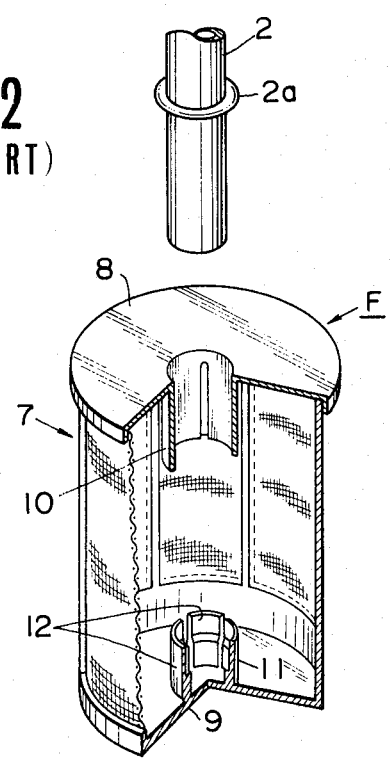
FIG. 2 is a perspective view, partly in section, showing another conventional filter device in a disassembled condition.
Figure 3:
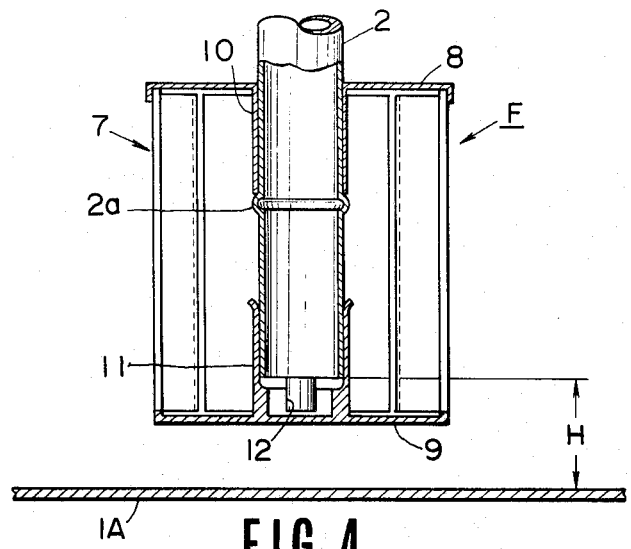
FIG. 3 is a sectional view of the conventional filter device shown in FIG. 2 in its assembled condition.
Figure 4:
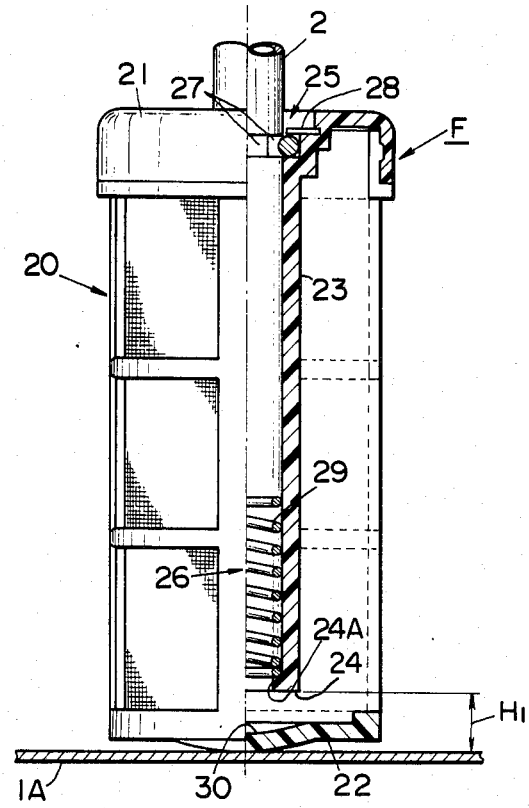
FIG. 4 is a sectional view showing a filter device for use in a fuel tank according to a first embodiment of this invention.

FIG. 4 shows a first embodiment of this invention. A filter body 20 has an upper wall 21 and a bottom wall 22. A guide portion 23 projects from a center portion of the upper wall 21 toward the bottom wall 22. The guide portion 23 extends substantially through the full length of the filter body 20. The lower end of the guide portion 23 is positioned near the bottom wall 22. The guide portion 23 is formed in a pipe shape and has an intake hole 24 at its lower end. It is preferable that the upper wall 21 of the filter body 20 and the guide portion 23 are integrally formed. A central portion of the upper wall 21 is formed in a step shape at its open edge so as to receive at its step portion 40 a seal ring 27 and a retaining ring 28.

Figure 7:
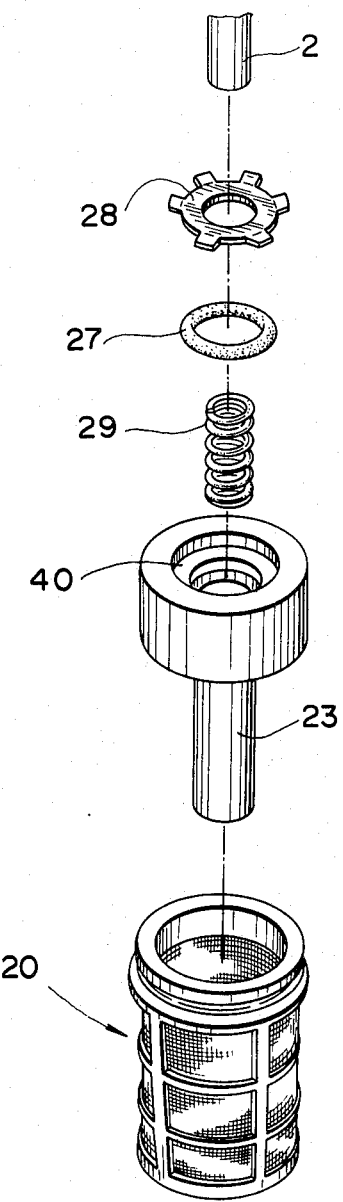
FIG. 7 is a perspective view in a disassembled condition showing essential members of the fuel device shown in FIG. 4.

As best shown in FIG. 7, the seal ring 27 is an O-ring. The retaining ring 28 has plural projections outwardly protruding at its periphery which are pressed against the step portion 40 of the upper wall 21 so as to prevent the seal ring 27 from slipping out.

Such a step portion for the seal ring 27 and the retaining ring 28 may be forming in an upper open edge portion of the guide portion 23.

A lower portion of the suction pipe 2 is slidably inserted into the guide portion 23 in its axial direction and resiliently retained by the seal ring 27 at the step portion 40.

In the embodiment of FIG. 4, the seal ring 27 and retaining ring 28 constitute means 25 for preventing the suction pipe 2 from slipping out.

Providing between a lower open end 24 of the guide portion 23 and the lower end of the suction pipe 2 is a spring means 26 such as a coil spring 29 for biasing the filter body 20 toward the bottom wall 1A of the tank body. A flange 24A is provided at the lower tip of the guide portion 23 and projects horizontally toward the axis of the tubular guide portion so that the spring 29 is placed on the flange 24A and biases the filter body toward the bottom of the tank. As is shown, the flange 24A extends only sufficiently to receive the spring and does not significantly restrict the flow path.

A retaining force of the seal ring 27 for the suction pipe 2 is predetermined so as to be smaller than a crushed load of the filter body 20 in its axial direction. Due to the biasing force of the coil spring 29, the bottom wall 22 of the filter body 20 resiliently contacts the bottom wall 1A of the tank body.

A recess portion 30 is formed at the filter bottom wall 22 so as to face the lower open end 24 of the guide portion 23 and the lower end of the suction pipe 2 so that a volume or space near the intake hole 24 increases thereby to permit the fuel to be smoothly sucked.

In the embodiment of FIG. 4, the filter body 20 always contacts the bottom wall 1A of the tank body 1. Therefore, the distance H1 between the intake hole 24 of the guide portion 23 and the bottom wall 1A of the tank body 1 can be set very small. As a result, the fuel suction limit of the suction pipe 2 can be remarkably enlarged so as to increase the substantial tank volume.

Although the filter body 20 contacts the bottom wall 1A of the tank body 1, because the suction pipe 2 is slidably inserted into the guide portion 23 of the filter body 20, even if the bottom wall 1A of the tank body 1 is upwardly deformed in case of road interferences thereof, the filter body 20 can be prevented from crushing. Further, as the filter body 20 always contacts the tank bottom wall 1A due to the biasing force of the coil spring 29, the fuel suction power decrease can be avoided.

Figure 5:
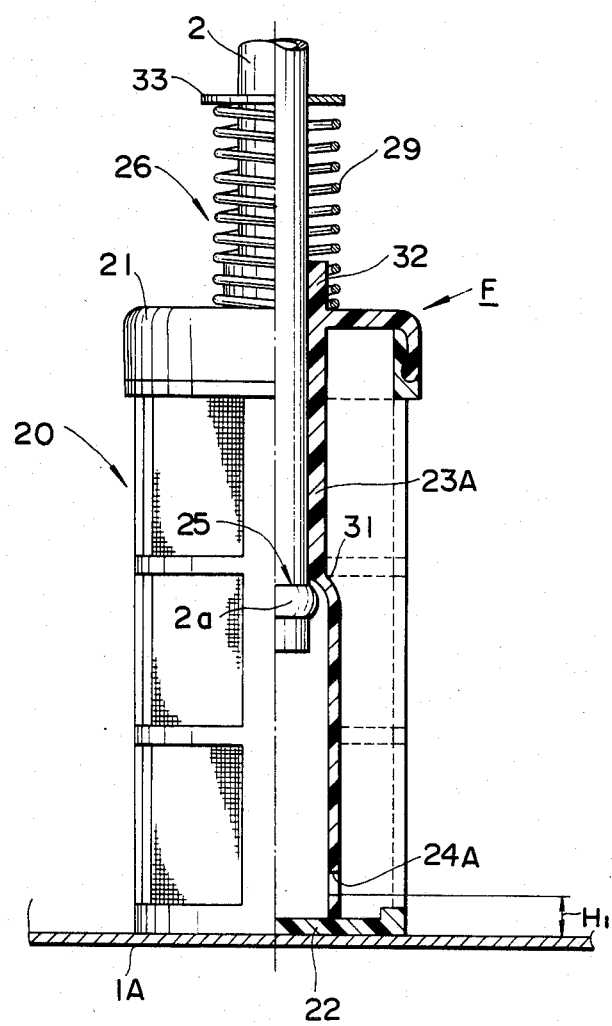
FIG. 5 is a sectional view showing a second embodiment of this invention.
Figure 6:
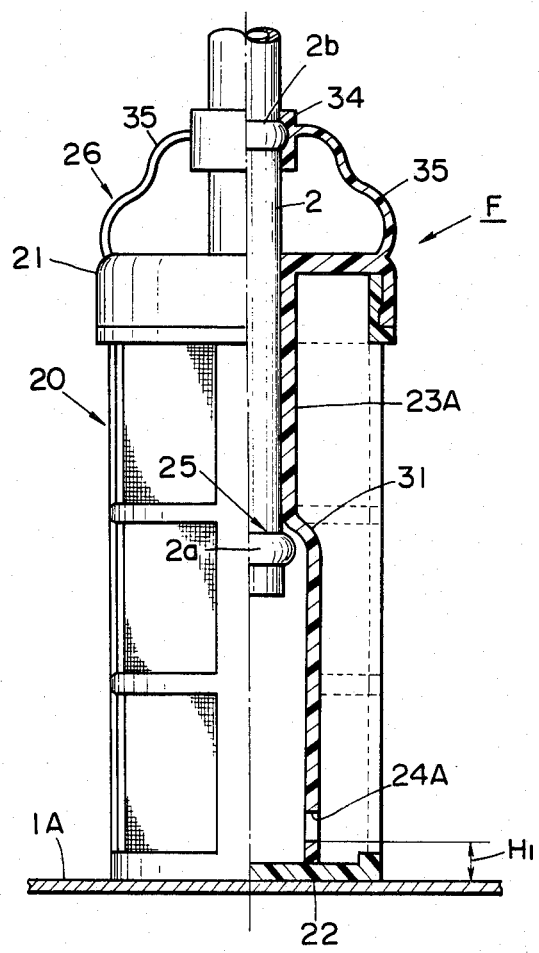
FIG. 6 is a sectional view showing a third embodiment of this invention.

FIGS. 5 and 6 show second and third embodiments of this invention, respectively. The same reference numerals denote the same members or portions as in the first embodiment so that those will not be explained in detail. The lower end of the guide portion 23A contacts the bottom wall 22 of the filter body 20. An intake hole 24A is formed in the guide portion 23A. The guide portion 23 has at its intermediate portion a step-shaped retaining portion 31. The suction pipe 2 has near its lower end a protruding portion 2a formed by bulging thereof. The protruding portion 2a engages the retaining step portion 31 so as to constitute means 25 for preventing the suction pipe 2 from slipping out. The spring means 26 is placed outside the filter body 20.

In the embodiment of the FIG. 5, the spring means 26 is a coil spring 29 which is placed between a spring seat portion 32 upwardly projecting integrally from the guide portion 23A and a spring seat 33 formed at the suction pipe 2. The filter body 20 is biased toward the bottom wall 1A of the tank body by means of the coil spring 29. The protruding portion 2a and the step portion 31 are engaged with each other.

In the embodiment of FIG. 6, the filter upper wall 21 has a central boss portion 34 and a plurality of leaf or plate spring portions 35 integrally formed thereby to constitute the springs means 26.

The suction pipe 2 is bulged so as to form another protruding portion 2b. This protruding portion 2b engages the boss portion 34 so that the leaf spring portion 35 functions as the spring means 26 whereby the filter body 20 is biased toward the tank bottom wall 1A. The embodiments of FIGS. 5 and 6 can obtain the advantages similar to those of the embodiment of FIG. 4.

In the embodiments of FIGS. 4, 5 and 6, the means 25 for preventing the suction pipe 2 from slipping out can be omitted. For example, in the embodiment of FIG. 4, the seal ring 27 and the retaining ring 28 can be omitted. The friction between the suction pipe 2 and the guide portion 23 can be used to prevent the suction pipe 2 from slipping out. In the embodiment of FIG. 5, the protruding portion 2a of the suction pipe 2 can be omitted and the guide portion 23A can be formed straight. The friction between the suction pipe 2 and the guide portion 23A can be used to prevent the suction pipe 2 from slipping out. In the embodiment of FIG. 6, the protruding portion 2a of the suction pipe can be omitted and the friction between the suction pipe 2 and the guide portion 23A can be used to prevent the suction pipe 2 from slipping out.

In a modified mode of this invention, the filter body 20 can be apart from the tank bottom wall 1A. If the tank bottom wall 1A is inwardly deformed in the tank body 1 so as to press the filter body 20, because the filter body 20 is biased toward the tank bottom wall 1A, the substantial tank volume can be increased as compared with the prior art filter devices.

We claim:

1. A filter for use in a fuel tank, said fuel tank being provided with a suction pipe mounted substantially vertically with a first intake opening formed at the tip of a lower portion and spaced a first distance from the bottom wall of the tank, said filter comprising:

a filter body having an upper wall and a lower wall;

a tubular guide portion extending axially from said upper wall through the filter body toward said lower wall and having a second intake opening near the lower wall of the filter body;

said tubular guide portion including a first section supported for sliding movement on the lower portion of said suction pipe and a second section of said guide portion extending beyond the tip of the suction pipe substantially the entire said first distance to the bottom wall of the tank, said second intake opening being spaced a second distance less than said first distance from the bottom wall of the tank, and said filter body, including said guide portion, being slidable along said suction pipe to prevent damage to the filter in the event the bottom wall of the tank is collapsed inwardly for a portion of said first distance;

spring means extending between the suction pipe and the filter body for biasing the filter body toward the bottom wall of the tank; and retaining means provided at said lower portion of the suction pipe for retaining said guide portion and for preventing the suction pipe from slipping out of the filter body.

2. The filter of claim 1, wherein the upper wall of the filter body and the guide portion is integrally formed.

3. The filter of claim 1, wherein the spring means is a coil spring placed between a spring seat formed at the suction pipe and the upper wall or the guide portion of the filter body.

4. The filter of claim 1, wherein the spring means includes a plate spring placed between a boss portion fixed to the suction pipe and the upper wall of the filter body.

5. The filter of claim 4, wherein the suction pipe is bulged so as to form a protruding portion which is fixed to the boss portion.

6. The filter of claim 1 wherein said retaining means comprises a bulged portion formed on said lower portion of the suction pipe and a stepped portion of the guide portion which is adapted to engage with said bulged portion for preventing the suction pipe from slipping out.

7. The filter of claim 6 wherein said second section being coaxial with said first section and has a diameter larger than that of said first section, and a third section which connects said first and second sections, said third section being adapted to engage with said bulged portion of the suction pipe for preventing the suction pipe from slipping out.

8. The filter of claim 1 wherein the guide portion extends to contact the lower wall of the filter body and the second intake opening is a through-hole formed on the guide portion near said lower wall for sucking the fuel therethrough.

9. A filter for use in a fuel tank, said fuel tank being provided with a suction pipe mounted substantially vertically with a first intake opening formed at the tip of a lower portion and spaced a first distance from the bottom wall of the tank, said filter comprising:
   a filter body having an upper wall and a lower wall;
   a tubular guide portion extending axially from said upper wall through the filter body toward said lower wall and having a second intake opening near the lower wall of the filter body;
   said tubular guide portion being sized and dimensioned for sliding movement of the lower portion of said suction pipe with said guide portion extending beyond the tip of the suction pipe substantially the entire said first distance to the bottom wall of the tank, said second intake opening being spaced a second distance less than said first distance from the bottom wall of the tank, and said filter body, including said guide portion, being slidable along said suction pipe to prevent damage to the filter in the event the bottom wall of the tank is collapsed inwardly for a portion of said first distance;
   spring means extending between the suction pipe and the filter body for biasing the filter body toward the bottom wall of the tank;
   retaining means provided at said lower portion of said suction pipe for retaining said guide portion and for preventing the suction pipe from slipping out of the filter body; and
   said filter body having a strength sufficient to withstand a given crushed load force exerted axially on said filter body, and said second means exerting a predetermined retaining force less than said crushed load force to prevent said filter body from being crushed by allowing said filter body to slide on said suction pipe upon inwardly collapsing movement of the tank bottom wall.

10. The filter of claim 9 wherein said retaining means comprises a seal ring, a retaining ring and a stepped portion formed on one of the upper walls of the filter body and the guide portion for receiving said seal ring and said retaining ring, said seal ring resiliently holding the suction pipe relative to the filter body and said retaining ring preventing the seal ring from slipping out.

11. A filter for use in a fuel tank, said fuel tank being provided with a suction pipe mounted substantially vertically with a first intake opening formed at the tip of a lower portion, and spaced a first distance from the bottom wall of the tank, said filter comprising:
   a filter body having an upper wall and a lower wall;
   a tubular guide portion extending axially from said upper wall through the filter body toward said lower wall and terminating near said lower wall with a second intake opening at its lower tip;
   said tubular guide portion receiving therein said lower portion of the suction pipe and being slidable, together with the filter body, on said lower portion of the suction pipe;
   said second intake opening being spaced a second distance less than said first distance from the bottom wall of the tank of that the fuel is sucked from said second intake opening through said guide portion and said first intake opening into said suction pipe;
   a flange provided at the lower tip of the guide portion, said flange projecting substantially horizontally from said lower tip toward the axis of the guide portion without substantially restricting the flow path for fuel through said second intake opening;
   spring means placed within the guide portion with its upper end contacting the lower tip of the suction pipe and with its lower end being placed on said flange for biasing the filter body toward the bottom wall of the tank;
   said spring means allowing the filter body, including said guide portion, to slide along said suction pipe against the biasing force in the event the bottom wall of the tank is collapsed inwardly for a portion of said first distance so as to prevent damage to the filter.

12. The filter of claim 11, wherein friction between the suction pipe and the guide portion is used to prevent the suction pipe from slipping out.

13. The filter of claim 11 wherein the upper wall of the filter body and the guide portion are integrally formed.

14. The filter of claim 11 wherein the guide portion and the flange are integrally formed.

15. The filter of claim 11 wherein the upper wall of the filter body, the guide portion and the flange are integrally formed.

16. The filter of claim 11 wherein the lower wall of the filter body is formed with a recess which faces the second intake opening of the guide portion.

17. The filter of claim 11 wherein said spring means is a coil spring.

18. The filter of claim 11 further comprising means for resiliently retaining the suction pipe relative to the filter body so as to prevent it from slipping out of the filter body.

19. The filter of claim 18 wherein said retaining means comprises a seal ring, a retaining ring and a stepped portion formed on one of the upper walls of the filter body and the guide portion for receiving said seal ring and said retaining ring, said seal ring resiliently holding the suction pipe relative to the filter body and said retaining ring preventing the seal ring from slipping out.

20. A filter for use in a fuel tank, said fuel tank being provided with a suction pipe mounted substantially vertically with a first intake opening formed at the tip of a lower portion, and spaced a first distance from the bottom wall of the tank, said filter comprising:
   a filter body having an upper wall and a lower wall;
   a tubular guide portion extending axially from said upper wall through the filter body toward said lower wall and terminating near said lower wall;
   said tubular guide portion receiving therein said lower portion of the suction pipe and being slidable, together with the filter body, on said lower portion of the suction pipe;
   said tubular guide portion having at its lower tip a portion which projects substantially horizontally from said lower tip toward the axis of the guide portion and defines a second intake opening thereat;
   said second intake opening being spaced a second distance less than said first distance from the bottom wall of the tank so that the fuel is sucked from said second intake opening through said guide portion and said first intake opening into said suction pipe;

spring means placed within the guide portion with its upper end contacting the lower tip of the suction pipe and with its lower end being placed on said substantially horizontally projection portion of the guide portion for biasing the filter body toward the bottom wall of the tank;

said spring means allowing the filter body, including said guide portion, to slide along said suction pipe against the biasing force in the event the bottom wall of the tank is collapsed inwardly for a portion of said first distance so as to prevent damage to the filter.

* * * * *